United States Patent
Garg et al.

(10) Patent No.: US 7,843,862 B2
(45) Date of Patent: Nov. 30, 2010

(54) ADHOC NETWORKING

(75) Inventors: Shashank Garg, Bangalore (IN); P. Ravi Menon, Bangalore (IN); Mark Mathias, Bangalore (IN)

(73) Assignee: Encore Software Limited, Bangalore (IN)

( * ) Notice: Subject to any disclaimer, the term of this patent is extended or adjusted under 35 U.S.C. 154(b) by 867 days.

(21) Appl. No.: 11/804,049

(22) Filed: May 16, 2007

(65) Prior Publication Data

US 2010/0260064 A1    Oct. 14, 2010

(30) Foreign Application Priority Data

May 18, 2006    (IN) .......................... 871/CHE/2006

(51) Int. Cl.
*H04B 7/00* (2006.01)
(52) U.S. Cl. ...................... 370/310; 701/213; 701/214; 701/215; 342/357.06
(58) Field of Classification Search ................. 370/310, 370/320, 328, 338; 701/213, 214, 215, 301; 342/357.06, 357.08, 357.09, 357.12, 357.14, 342/462, 463
See application file for complete search history.

(56) References Cited

U.S. PATENT DOCUMENTS

| | | | | |
|---|---|---|---|---|
| 6,922,635 | B2 * | 7/2005 | Rorabaugh | 701/213 |
| 7,315,281 | B2 * | 1/2008 | Dejanovic et al. | 342/463 |
| 2005/0099942 | A1 * | 5/2005 | Kurihara | 370/229 |
| 2005/0124293 | A1 * | 6/2005 | Alicherry et al. | 455/41.2 |
| 2005/0130634 | A1 * | 6/2005 | Godfrey | 455/414.1 |
| 2006/0029009 | A1 * | 2/2006 | Alapuranen et al. | 370/310 |

* cited by examiner

*Primary Examiner*—Jayanti K Patel
*Assistant Examiner*—Jung Park
(74) *Attorney, Agent, or Firm*—Ash Tankha

(57) ABSTRACT

This invention provides a method of transmitting and receiving packets containing data and positional information for a plurality of devices in a radio frequency network in combination with a global positioning system. The periodic position coordinates of each said device are determined using the global positioning system. The position coordinates are transmitted from each device at staggered points in time that are randomized, and the randomizing operation is performed in discrete steps, wherein the time period of each discrete step is of adequate duration for one device to transmit a positional update. A positional update table and proximity table is created and maintained for each device, and these tables are transmitted to every other device in the network at periodic intervals.

8 Claims, 6 Drawing Sheets

| ID | Latitude | Longitude | Time Stamp (minutes) |
|---|---|---|---|
| A | ddd mm ss.ss | ddd mm ss.ss | Mm |
| B | ddd mm ss.ss | ddd mm ss.ss | Mm |
| C | ddd mm ss.ss | ddd mm ss.ss | Mm |

| | |
|---|---|
| B | 1 |
| C | 0 |
| D | 0 |
| E | 1 |
| F | 1 |

| HEADER | DEVICE ID | MESSAGE ID | REQUEST TO RETRANSMIT |
|---|---|---|---|
| 109 | 110 | 111 | 112 |

ADHOC NETWORKING

BACKGROUND

This invention in general relates to wireless networking and specifically relates to a method and system of transmission of packets in a radio frequency network in conjunction with a global positioning system.

SUMMARY OF THE INVENTION

The method and system disclosed herein enables device users to remain in real-time contact with one another.

The method and system disclosed herein enables global position system updates and pictorial view of the units in a given topography of the device users in real-time using a geographic information system (GIS) map of the theatre of operation loaded on each embedded device.

The method and system disclosed herein provides a means of providing a set of authenticated clients in a networked theatre of operations, a set of tiled maps of the geographical region of the users and a protocol for enabling devices to enter or leave the networked theatre of operation.

The method and system disclosed herein provides an embedded computer application that allows a complete real-time operational view of the positions of the device users, to a controller with a device who is several kilometers away from the theatre of operation and allows the controller to intervene through dedicated messaging protocol.

The method and system disclosed herein provides an adhoc networking protocol that enables the effective operational radius to be enhanced beyond the radio range of a single pair of devices by automatically relaying positional information tables through an intelligent state-table based decision approach that reduces unnecessary networking traffic on a low-bandwidth radio network.

The method and system disclosed herein also provides an adhoc networking protocol that enables the embedded device to adaptively learn the shortest path to communicate with another embedded device not in direct radio range with it.

This invention provides a method of transmitting and receiving packets containing data and positional information between a plurality of devices in a radio frequency network in combination with a global positioning system. The periodic position coordinates of each said device are determined using the global positioning system. All the device clocks are synchronized to a clock in the global positioning system. The position coordinates are transmitted from each device at staggered points in time that are randomized, and the randomizing operation is performed in discrete steps, wherein the time period of each discrete step is of duration sufficient for one device to transmit a positional update. A positional update table is generated at each device containing device identifiers, positional coordinates and time stamps for all devices in the radio frequency network. A proximity table is created and maintained for each device that contains a table of identifiers for all other devices along with information on whether the device is in direct contact with said other devices or not. A packet comprising data and position coordinates derived from said positional update table are transmitted from a device to one or more intended recipient devices.

DETAILED DESCRIPTION OF THE INVENTION

Figure 1A:
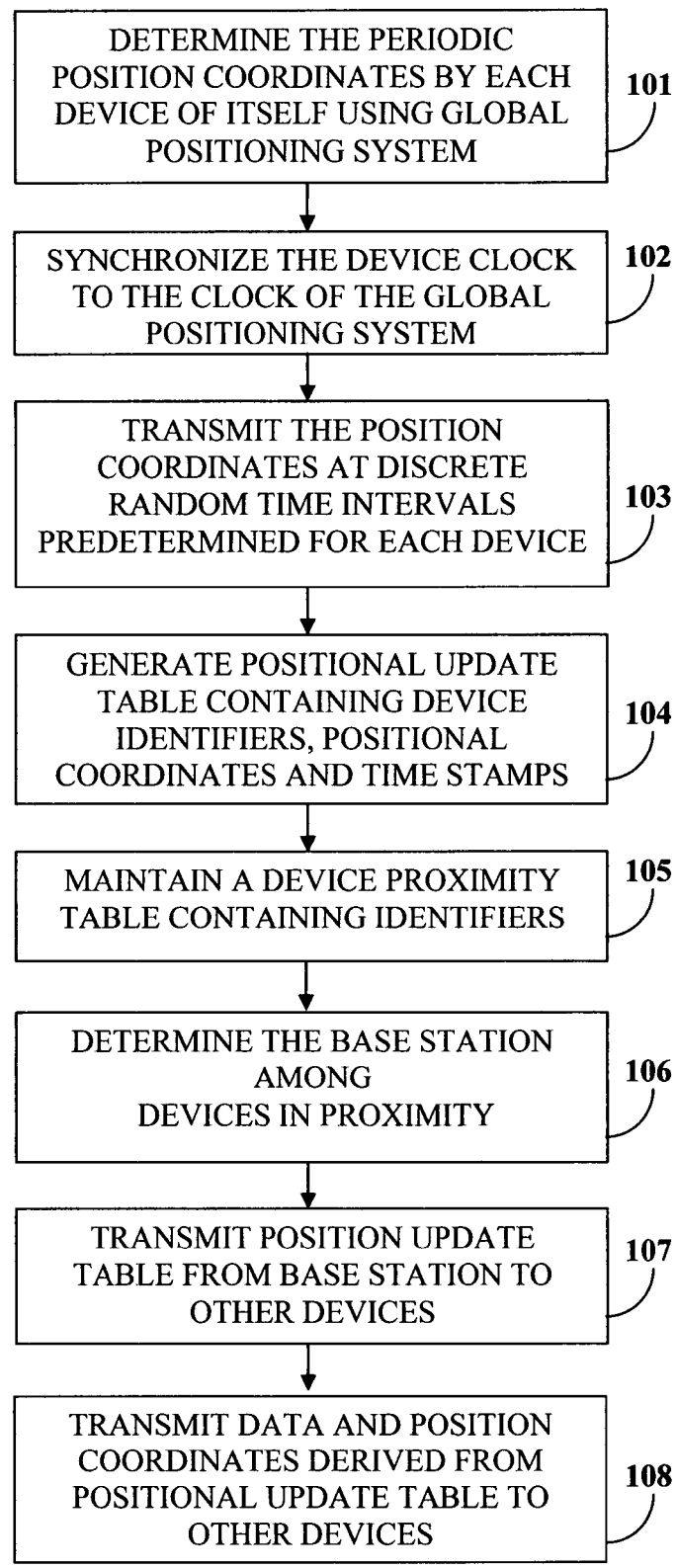
FIG. 1A illustrates a method of transmitting and receiving packets between a plurality of devices in a radio frequency network in combination with a global positioning system.

FIG. 1A illustrates a method of transmitting and receiving packets between pluralities of devices in a radio frequency network in combination with a global positioning system.

The periodic position updates of each device are determined using a global positioning system (GPS) receiver within the device that is in communication with the global positioning system 101. All the device clocks are synchronized to the clock of the global positioning system 102. Thereafter, at periodic intervals, for example, every 20 seconds, i.e., 00 second, 20 seconds, 40 seconds, etc., each device waits for a random duration "r", which is a function of the device identifier (ID), and transmits positional data. The device takes care of sensing a free channel. In order to prevent the possibility of simultaneous transmission by two or more devices, the timing is staggered for pushing out data to the data storage buffer of the device by a random duration. The randomized value 'r' for each device is in discrete steps, each of which is of duration sufficient for a device to transmit a positional update. The highest value of 'r' is a maximum value of the total time for 'n−1' devices to transmit positional updates, where n is the number of devices in the network. Positional updates get priority over other types of data, such as short message service (SMS) and audio. A master slot is introduced for positional updates. The size of the master slot is dynamically defined based on the number of devices 'n' in the network. 'T' is the time taken for 'n' devices to transmit their positional updates including extra allowance. The remaining time till the next master slot begins is available for other data, such as SMS. Whenever any other type of data is to be sent out by a device, it will check the current time to see that it is within the range 0 to 20 seconds, or 20+T to 40 seconds, or 40+T to 60 seconds and so on.

Position coordinates are transmitted from each device. The devices transmit the positional data at staggered points in time, and the staggered points are randomized in discrete steps 103. The time period of each discrete step is of a duration sufficient for one device to transmit a positional update. The device checks for a free channel before transmitting. In a channel, simultaneous transmission and consequent loss of packets exists, and if the option of acknowledgement and resending is chosen in the device, collisions occur in the channel. Hence an alternative method of staggering the times of transmission is used to avoid collisions.

Figures 1B, 1C, 1D:
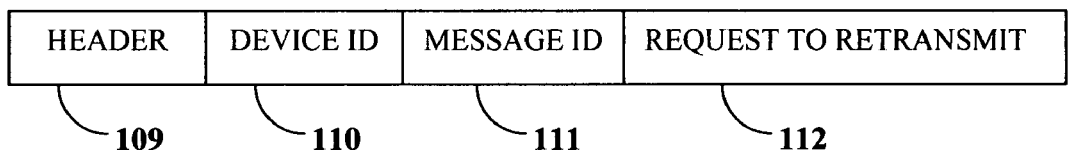
FIG. 1B illustrates a positional update table.
FIG. 1C illustrates a proximity table.
FIG. 1D illustrates a transmission packet.

Each device generates a positional update table containing device identifiers, positional coordinates and time stamps for all devices in the radio frequency network 104. An example of such a positional update table is illustrated in FIG. 1B. The first column indicates the device ID. The second and third column indicates latitude and longitude co-ordinates of the device respectively. The latitude and longitude co-ordinates are represented in the format day-minute-seconds (ddd mm ss.ss). The fourth column indicates time stamp in minutes (Mm).

Each device creates and maintains a proximity table containing a table of identifiers for all other devices along with information on whether the device is in direct contact with other devices or not 105. The proximity table is updated based on reception of the positional coordinates. The device would flag 1 against any device ID with which it is in direct communication and 0 for out of communication. The example of a position table maintained by a device A in direct contact with B, E and F but not with C and D is illustrated in FIG. 1C, for the network condition illustrated in FIG. 3B.

There is no dependency on specific hardware and any device can perform the role of a base station. A base station is determined among the wireless network devices. The devices configured as base stations initiate the transmission of the positional table, when the base station configuration option in the device is enabled. The base station transmits its own positional table once every minute, preferably after the last cycle of positional updates at 40+T seconds. The base station is equipped with a higher gain and a higher mast antennae. The probability of a base station being in communication with the maximum number of devices is higher, as the base station is typically controlled by the a leader or a controller of the all the device users. A high probability ensures that that the base station can retransmit first. Any device can perform the role of a base station; this eliminates the chance of single point failures.

The positional update table is transmitted from the base station to other devices 106. In order to receive the positional update table, the devices in the receiving range checks the type of transmission and determines it to be a positional table. The device checks the time stamps against each device ID, and if the time stamp is later than the value in its own table, the device updates its own table. In the event any time stamps in the received tables are older than the device's own or if the received table has blanks, the device transmits its updated table to other devices. Whenever a device transmits a table, it sets a variable, for example, from z to 1. z should initially be set to 0, and if in a particular cycle there is a table transmission carried out, it is set to 1 and if no transmission of a table occurs, it should be set to 0. The devices which receive the updated table perform the same aforementioned actions.

The packets comprising data and position coordinates derived from the positional update table are transmitted from a device to one or more intended recipient devices 107. The transmitted packet illustrated in FIG. 1D will have a header 108, containing information about type of transmission, device ID 109, message ID 110 and request to retransmit (RTR) 111.

The type of transmission specifies the details of the position update, positional table, SMS and binary data. The device ID 109 indicates the source and destination ID's of the transmitted data. The message ID 110 is a counter maintained by the device, which is incremented for every message transmission for SMS, command and binary data only. The RTR 111 is used by a receiving device to decide whether to retransmit the information or not.

The following example illustrates the procedure by which different types of data and tables are transmitted in the wireless device network. Positional updates are transmitted by each device, for example, at 20 second intervals. The update contains the position coordinates and time stamp. The value of RTR 111 is set to zero which means other devices do not retransmit positional updates. Devices that are in range of the transmitting device update themselves and also update their proximity table. The devices also update their positional table. The devices would, at this stage, not have information of all the devices in the network. It may be noted that there would be multiple inputs received from a device in a minute but all these inputs will have the same time stamp.

Each device maintains a GIS engine that is periodically updated. The GIS engine also maintains position information of other devices. When a device receives a table of information containing GPS coordinates of other devices, the GIS engines is invoked and the GIS engine registers the GPS position of other devices. In this manner, the GIS engine updates the information on its position as well as the information on the position of other devices.

In an exemplary case, the devices in direct contact are updated on their GIS display every 20 seconds, and those out of direct contact are updated only from received positional tables which may be once a minute, or even later depending on the topology. In an exemplary case, three inputs in a minute ensure adequate redundancy.

Thus the positional table is continuously updated and is propagated till the edges of the network. In a linear spread, all devices till the outer edges get updated of positions of other devices until the base station and one hop beyond it. In the next minute, the cycle gets repeated and devices get updated of positions upto two hops away beyond the base station and so on. The data of a device n hop beyond the base station, in the opposite direction, would be n−1 minutes old. Thus, theoretically there is no limit on the spread of the network, and any number of devices spread in such a way that the chain is unbroken will get updated, in an acceptable time frame.

Figure 2:
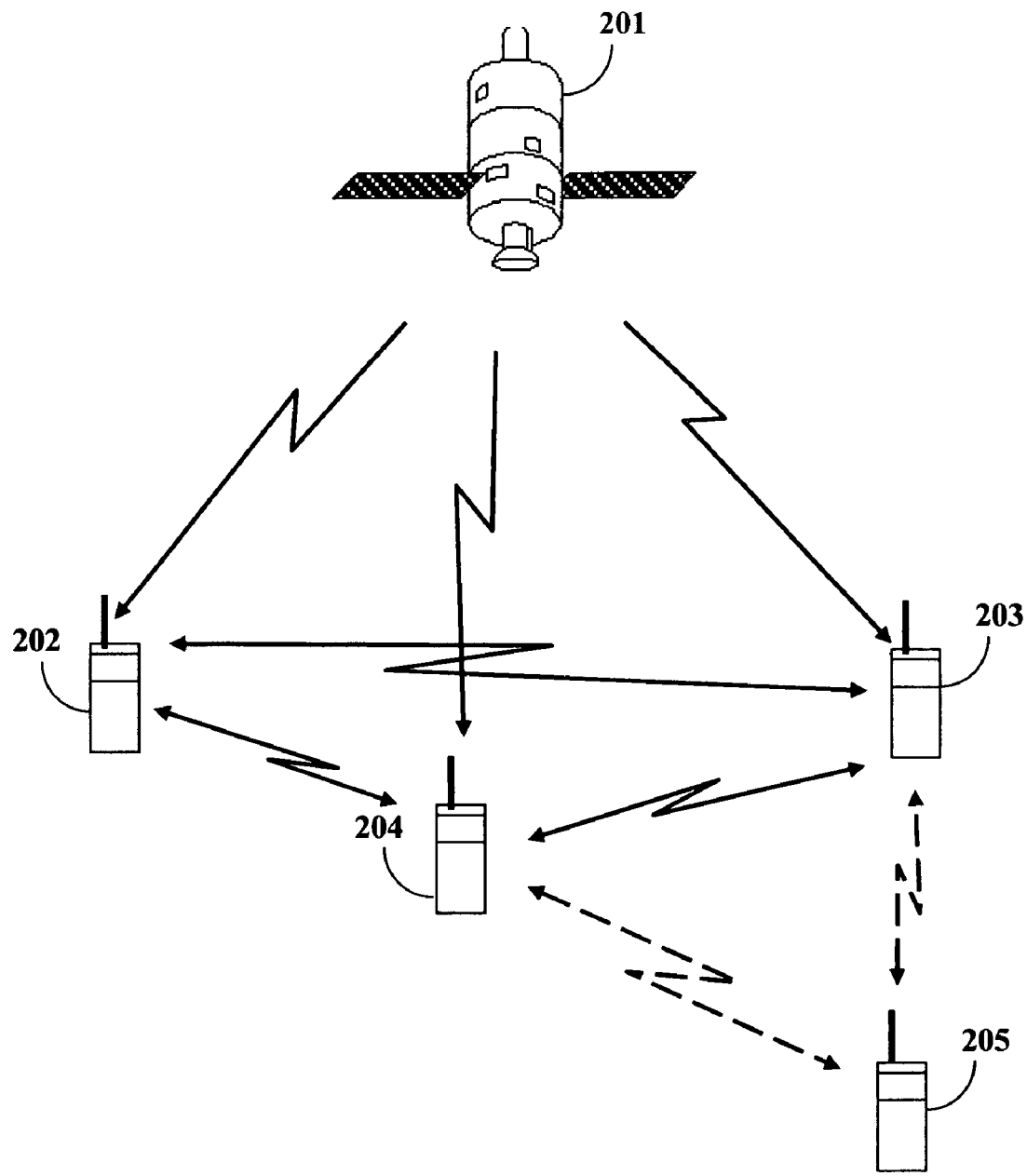
FIG. 2 illustrates a system for transmitting and receiving packets between a plurality of devices in a radio frequency network in combination with a global positioning system.

FIG. 2 illustrates a system for transmitting and receiving packets between a plurality of devices in a radio frequency network in combination with a global positioning system 201. The GPS receiver is used to determine the position coordinates of the devices. The position coordinates from the GPS satellite 201 is received by the handheld device antenna and is used by the device to determine its position. The handheld devices form a network where optionally one of the devices can assume the role of a base station 204. The devices exchange information among them. Some of the devices may be out of reach of the network as shown in case of device 3 205. Device 1 202 and device 2 203 are in range of each other and the base station 204 whereas device 3 205 is not in the range of other devices. In this example, the base station 204 is given priority in transmission.

Figure 3A:
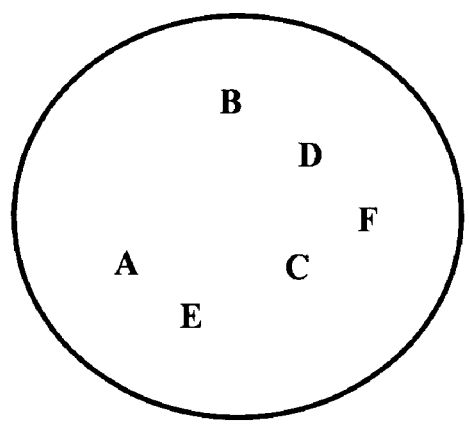
FIG. 3A illustrates an example of transmission procedure between devices, when all the devices are in range of each other.

FIG. 3A illustrates an example of a transmission procedure between devices, when all the devices are in range of each other. For example, if device A wishes to send a message to device C, device A checks its proximity table to confirm whether device C is in direct range with it and then sends the message with RTR 111 set to 0. For other devices the message is discarded, since RTR 111 is set to 0, Device A waits a predefined time x for an acknowledgement from device C and if it does not receive it, it flashes an error. The user then uses his or her discretion to transmit again.

Figure 3B:
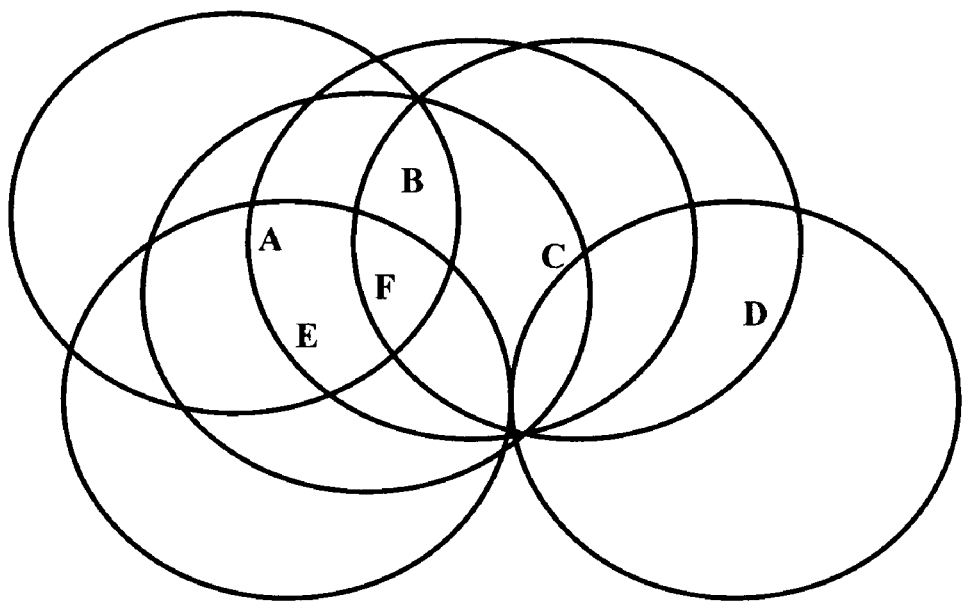
FIG. 3B illustrates an example of transmission procedure between devices, when all the devices are not within direct range of each other.

FIG. 3B illustrates an example of transmission procedure between devices, when the devices are not in direct range of each other. For example, if device A wishes to send a message to device C but knows that it is not in direct range of device C, device A will send the message with RTR 111 set to 1. Other devices in range of device A receive the message and see that RTR 111 is set to 1. The devices, say B and F that receive the message from device A and are in range of device C, retransmit the message again with RTR 111 set to 0. If a device is not in range of device C, it takes no action. Duplication of the same message is avoided by introducing the same random wait periods for different devices as in the case of positional updates. If device B transmits first and if any other device detects the transmission, and thereafter checks and finds that the message ID is same as before and that RTR 111 has been set to 0, the other device takes no further action and deletes the message. Device A can wait a longer time y for an acknowledgement from device C when RTR 111 is set to 1.

For the example stated above, if some other device decides to send a message at that instant and device B does not get to transmit, device F waits and then transmits. This transmission procedure will add redundancy. If reception of a message is detected, a device can wait until the end of reception, introduce its random delay and then send data into its buffer.

The probability of the base station 204 getting through to a particular device is higher than that of normal devices because it is better equipped with a higher gain and a higher mast antennae. So the base station 204 is given the first chance to transmit. In order to ensure this preference for the base station 204 transmission, all other devices introduce a wait time=(t+r) instead of only r, where t is a fixed delay to allow the base station 204 to come on the air first and r is the wait time of the device. If the base station 204 is in direct communication with C, it transmits; else, other devices in range transmit. RTR 111 gets set to 0 and remaining devices take no action.

Figure 3C:
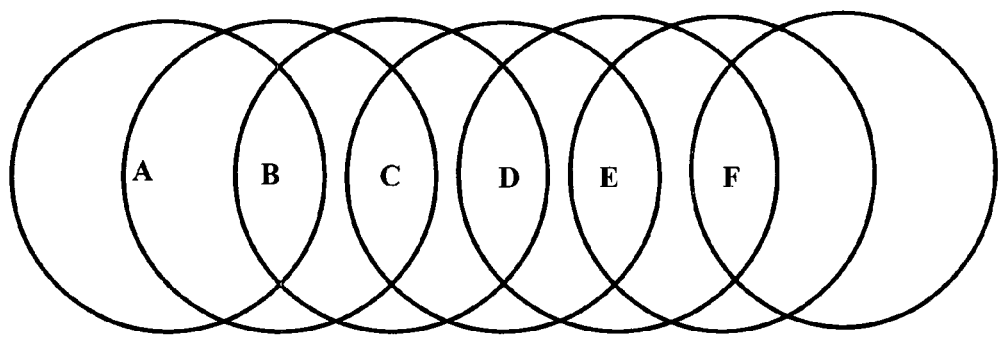
FIG. 3C illustrates an example when the source and destination devices are two hops away from each other.

FIG. 3C illustrates an example when the source and destination devices are two hops away from each other. If the receiving station, i.e., the destination device is more than two hops away, but the source device does not know how many hops away it is from the destination device, the source device transmits with RTR 111 set to 1. Other devices in range of the originating source device check the destination in the transmitted packet of the source device, notice that RTR 111 is 1, check their own proximity table and find it is not in range with the destination device and wait. After time t+rmax, where rmax is the maximum possible wait time of a device, i.e., a function of the total number of devices, it finds no other device has retransmitted the same message ID 110, so the device again waits its time t+r and retransmits with RTR 111 set to 2. Any other device, which had also received the transmitted packet and was waiting to retransmit, notices that the retransmission has taken place with altered RTR 111 and does not do so itself. The retransmitted message with RTR 111 is set to 2 is now handled as a new message, in a different manner. Any device which receives a message with RTR 111 set to 2, checks its proximity table to see if the destination device is in direct range. If in direct range, it transmits and sets RTR 111 to 0 as before. If RTR 111 gets set to 0 for a particular message ID 110, other devices do not take any action if the same message, i.e., a message with the same message ID 110 and source ID is received.

If a device receiving the message from the originating device is not in direct range with the destination device, it checks if its value of the flag z is 1 and it retransmits with RTR 111 is set to 2 only if the value of z was set to 1 in the last cycle. If this device receives the same message ID 110 and source ID again through retransmission by another device, it does not process the message further. This is done to ensure that the message does not propagate back in the same direction it came from and to prevent it from going into an endless loop of retransmissions in case the destination cannot be found. Also by checking the value of z before transmitting, it is ensured that all devices which are responsible for updating any other device gets to transmit and others do not, and hence the number of retransmissions are limited.

In case of broadcast and multicast transmission of a message, the originating device transmits with RTR 111 set to 3. Devices in range receive and give an acknowledgment (ack) if they are the recipient and transmit again with RTR 111 set to 3. The devices in range transmit only if in the last cycle it had transmitted a positional table i.e., if its value of z is found to be 1. This procedure eliminates the possibility of unnecessary retransmissions in the case where all devices are in range. If any device receives a packet with same message ID 110 and source device ID 109 again, the packet is ignored. Thus endless propagation is also avoided.

Figure 3D:
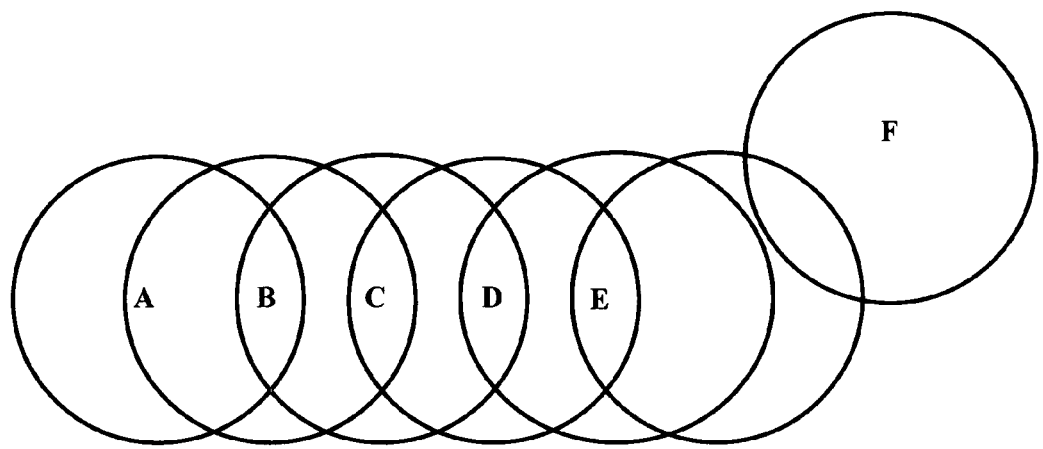
FIG. 3D illustrates an example when the source and destination devices are out of range with each other.

FIG. 3D illustrates an example when the source and destination devices are out of range from each other. If the receiving station, i.e., the destination device is more than two hops away, but the source device does not know how many hops away it is from the destination device, the source device transmits with RTR 111 set to 1. Other devices in range of the originating source device check the destination in the transmitted packet of the source device, notice RTR 111 is 1, check their own proximity table and find it is not in range with the destination device and wait. After time t+rmax, where rmax is the maximum possible wait time of a device, i.e., a function of the total no of devices, it finds no other device has retransmitted the same message ID 110, so the device again waits its time t+r and retransmits with RTR 111 set to 2. Any other device, which had also received the transmitted packet and was waiting to retransmit, notice that the retransmission has taken place with altered RTR 111 and does not do so itself. The retransmitted message with RTR 111 set to 2 is now handled as a new message, in a different manner. Any device which receives a message with RTR 111 set to 2 checks its proximity table to see if the destination device is in direct range. If in direct range, it transmits and sets RTR 111 to 0 as before. If RTR 111 gets set to 0 for a particular message ID 110, other devices do not take any action if the same message, i.e., a message with the same message ID 110 and source ID is received.

If a device receiving the message from the originating device is not in direct range with the destination device, it checks if its value of z is 1 and it retransmits with RTR 111 set to 2 only if the value of z was set to 1 in the last cycle. If this device receives the same message ID 110 and source ID again through retransmission by someone else, it does not process the message further. This is done to ensure that the message does not propagate back in the same direction it came from and to prevent it from going into an endless loop of retransmissions in case the destination cannot be found. Also by checking the value of z before transmitting, it is ensured that all devices which are responsible for updating any other device gets to transmit and others do no, and hence the number of retransmissions are limited.

The transmission of the proximity table helps in increasing the range of the network. The proximity table, through relay, enables a device to communicate with other device in the network even if the other device in not in direct range. Consider the case when a device is switched off or a person goes out of a radio range of sight. As each device transmit not only its own position but also the proximity table, and the last known location of each device is available in the proximity table. When the device is switched on again, or when the device comes into range, the latest proximity table is received and the device is now made aware of the positional information of other devices.

Figure 4:
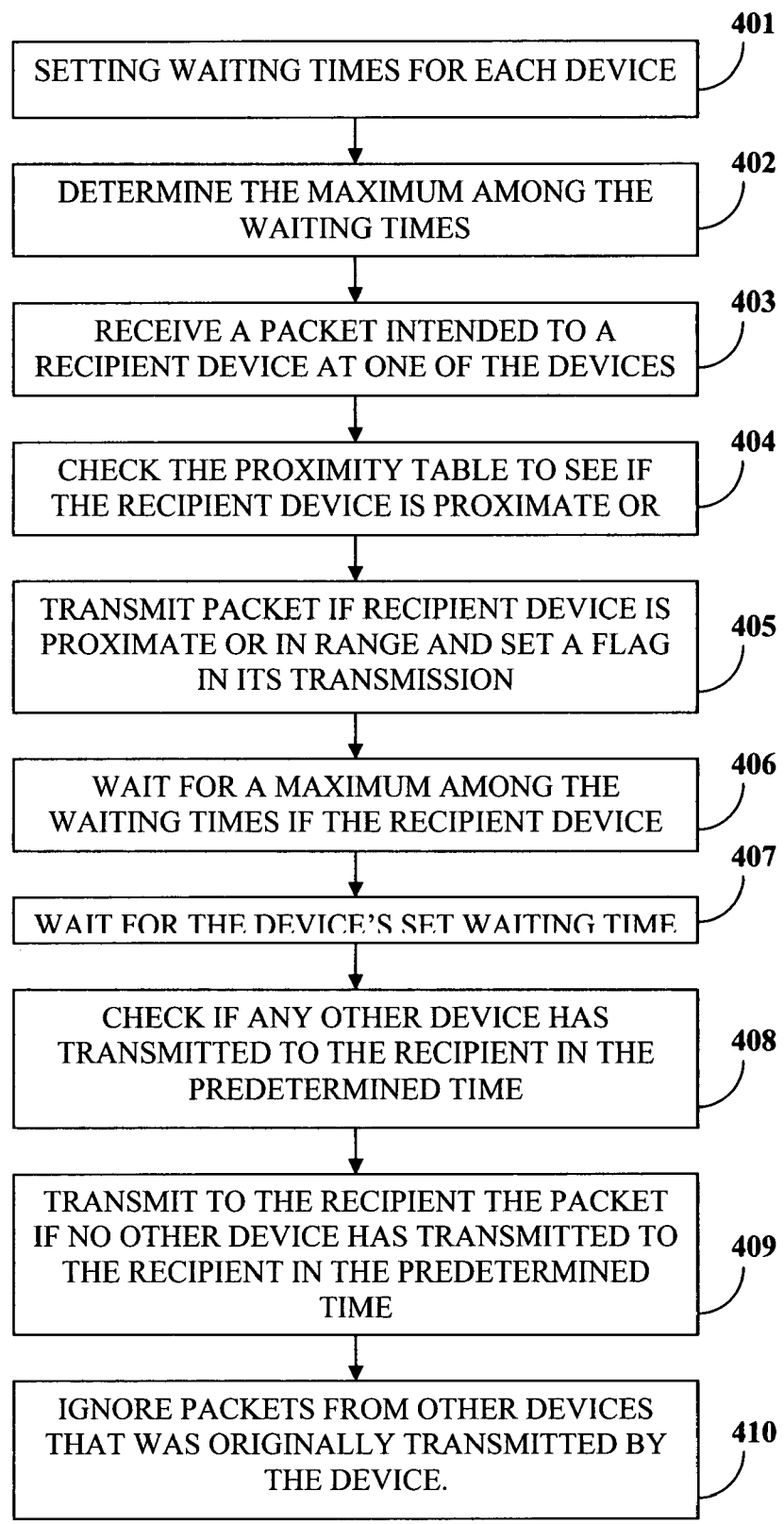
FIG. 4 illustrates a method of sending packets more than two hops away in a network of devices.

FIG. 4 illustrates a method of sending packets more than two hops away in a network of devices. The source device knows that it is out of range with the destination but does not know by how many hops. The source device transmits the packet with retransmission counter set to 1. The other devices in range, set waiting times for each device 401. The maximum among the waiting times is determined 402. One of the devices receives a packet intended to a recipient device 403. The device checks the proximity table to see if the recipient device is proximate or in range 404. The packet is transmitted if recipient device is proximate or in range and RTR 111 is incremented, indicating the other devices not to take any action 405. The device waits for the maximum among the waiting times if the recipient device is not proximate 406. The maximum time is a linear function of the number of devices in the network. The device waits for a set waiting time 407 and checks if any other device has transmitted to the recipient in the time 408. The device transmits the packet to the recipient if no other device has transmitted to the recipient in the time 409. The device ignores packets from other devices that were originally transmitted by the device 410.

The following example illustrates an application of the method and system disclosed herein. The inventive concept disclosed herein may be used to assist a forest ranger with communications and situational awareness. The wireless network device is a customized, computing platform, which provides a rich set of connectivity and location features in a small foot-print. It incorporates a GPS receiver unit for locating the position of the device and a proprietary radio frequency (RF) modem operating in the 2.4 GHz ISM Band for communicating with other such devices within a range of about three kilometers. The RF modem creates a network of devices that can communicate with each other. The media access layer enabled by this invention, supports the transfer of data packets, short messages (SMS) and speech communication. In this example, the system determines periodic position coordinates transmitted by each device, at 20 sec intervals, with a time stamp. A positional update table containing device Ids, positional data and time stamp is determined for all devices in the network. SMS/Remote commands, typically 160 bytes sent as and when needed are transmitted as unicast, broadcast or multicast data. Acknowledgements are provided for uni-cast and multi-cast SMS messages and commands. Voice is transmitted as a burst of 5 seconds, duly compressed and transmitted to those in direct range. Each device contains configuration info specifying the unique number of the device and total number of devices in the network. Point to point range is of the order of 800 m to 1.2 km. A cyclic redundancy code (CRC) introduced at the physical layer ensures distorted packets are dropped. Loss of packets cannot be determined. Different types of traffic are handled differently. A conditional relay mechanism is suggested by which a message can find its way to its destination with minimal retransmissions. Once data has been sent into the radio's buffer, there is no control over it and the radio will transmit it on sensing a free channel. Thus the algorithm of this invention controls the process of sending out data into the radio's buffer only. Collisions are minimized by staggering the times of individual devices to pump data out into the radio's buffer. Every device, on receiving a message, decides whether to retransmit it, based on certain conditions. Even after it has decided to retransmit, it waits for a specified duration and if during that duration someone else retransmits, the decision is taken again and in some cases, the message is dropped and not processed further.

We claim:

1. A method of transmitting and receiving packets containing data and positional information between a plurality of devices in a radio frequency network in communication with a global positioning system, wherein each device comprises a device clock, comprising the steps of:
   determining the periodic position coordinates of each said device using said global positioning system;
   synchronizing all the device clocks to a clock of said global positioning system;
   transmitting position coordinates from each device at staggered points in time that are randomized, wherein said randomizing is performed in discrete steps, and wherein the time period of each discrete step is of a duration sufficient for one device to transmit a positional update to other devices in the radio frequency network;
   generating a positional update table at each device containing device identifiers, said positional update table comprising positional coordinates and time stamps for all devices in said radio frequency network;
   creating and maintaining for each device a proximity table that contains a table of identifiers for all other devices with information on whether the device is in direct contact with said other devices or not; and
   transmitting said positioning update table and said proximity table of each device to every other device in the network, and receiving the positioning update table and said proximity table at each device in the network.

2. The method of claim 1, further comprising, waiting for a period by a device, and if during that period some other device transmits, the decision to transmit is reconsidered, and in some cases the message is dropped.

3. The method of claim 1, further comprising the steps of pre-storing configuration information in each device to specify the unique number of the device and the total number of devices in the network.

4. The method of claim 1, wherein the transmission of positional updates get a priority over transmission of other types of traffic.

5. The method of claim 1, wherein the step of transmitting said positioning update table and said proximity table further comprises the steps of:
   determining a base station among said wireless network devices;
   receiving said positional update table and the proximity table from each device only at the base station to other wireless network devices; and
   transmitting said positional update table and the proximity table from said base station to other wireless network devices.

6. A method of sending packets more than two hops away in a network of devices, wherein each device contains a proximity table, comprising the steps of:
   setting waiting times for each device;
   determining the maximum among said waiting times;
   receiving a packet intended to a recipient device at one of said devices;
   checking the proximity table to see if the recipient device is proximate or in range;
   transmitting said packet if recipient device is proximate or in range and setting a counter in its transmission, wherein said counter indicates to other devices not to take any action;
   waiting for said maximum among the waiting times at a device that receives said transmitted packet if the recipient device is not proximate, wherein said maximum time is a linear function of the number of devices in the network;
   waiting for the device's set waiting time;
   checking if any other device has transmitted to the recipient in the waiting time; and transmitting to the recipient the packet if no other device has transmitted to the recipient in the waiting time.

7. The method of claim 6, wherein the step of receiving the positioning update table and said proximity table at each device in the network, comprises the step of ignoring packets from other devices that was originally transmitted by said receiving device.

8. A system of transmitting and receiving packets containing data and positional information between a plurality of devices, comprising:

devices further comprising global positioning system transceivers, radio frequency transceivers and a device clock;

a radio frequency network in communication with a global positioning system, wherein;

the periodic position coordinates of each said device is determined using said global positioning system;

all the device clocks are synchronized to a clock of said global positioning system;

position coordinates from each device are transmitted at staggered points in time that are randomized, wherein said randomizing is performed in discrete steps, and wherein the time period of each discrete step is of a duration sufficient for one device to transmit a positional update to other devices in the radio frequency network;

a positional update table within each device containing device identifiers, said positional update table comprising positional coordinates and time stamps for all devices in said radio frequency network;

a proximity table within each device containing a table of identifiers for all other devices with information on whether the device is in direct contact with said other devices or not; and wherein said positioning update table and said proximity table of each device is transmitted to every other device in the network, and the positioning update table and said proximity table is received at each device in the network.

* * * * *